US012742659B2

(12) United States Patent
Neyama et al.

(10) Patent No.: US 12,742,659 B2
(45) Date of Patent: Sep. 22, 2026

(54) INFORMATION PROCESSING DEVICE

(71) Applicant: TOYOTA JIDOSHA KABUSHIKI KAISHA, Toyota (JP)

(72) Inventors: Ryo Neyama, Toyota (JP); Katsuya Taguchi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/822,671

(22) Filed: Sep. 3, 2024

(65) Prior Publication Data

US 2025/0102321 A1 Mar. 27, 2025

(30) Foreign Application Priority Data

Sep. 26, 2023 (JP) ................................ 2023-163106

(51) Int. Cl.
*G01C 21/00* (2006.01)

(52) U.S. Cl.
CPC ....... *G01C 21/387* (2020.08); *G01C 21/3815* (2020.08)

(58) Field of Classification Search
CPC .......................... G01C 21/387; G01C 21/3815
See application file for complete search history.

(56) References Cited

U.S. PATENT DOCUMENTS 10,414,397 B2 9/2019 Kindo
10,739,144 B2 8/2020 Watanabe et al.
10,852,734 B2 12/2020 Matsui
10,895,470 B2 1/2021 Arakawa et al.
11,120,685 B2 9/2021 Hayashi et al.
11,231,285 B2 1/2022 Hokai et al.
11,255,681 B2 2/2022 Sakaguchi et al.
(Continued)

FOREIGN PATENT DOCUMENTS

JP 2017-223797 A 12/2017

OTHER PUBLICATIONS

Zeina Abu-Aisheh, et al., "An Exact Graph Edit Distance Algorithm for Solving Pattern Recognition Problems", 4th International Conference on Pattern Recognition Applications and Methods 2015, Jan. 2015, Lisbon, Portugal, HAL Id: hal-01168816 <https://hal.science/hal-01168816> (Submitted on Jun. 26, 2015).

*Primary Examiner* — Tyler J Lee
*Assistant Examiner* — Clint Pham
(74) *Attorney, Agent, or Firm* — SoraIP, Inc.

(57) ABSTRACT

An information processing device for extracting a difference between a reference map and an input map, the information processing device comprising: a control unit that divides each region of a reference map and an input map into a branch region where a branch of a road or a lane exists, and a non-branch region other than the branch region; determine a branch region and a non-branch region of the input map corresponding to the branch region and the non-branch region of the reference map based on an overlap degree of the branch region of the reference map and the branch region of the input map, and determine a graph editing path in which an editing cost determined by a predetermined criterion is minimized for each of the corresponding regions; and output the graph editing path for multiple corresponding regions as a difference between the reference map and the input map.

5 Claims, 6 Drawing Sheets

(56) References Cited

U.S. PATENT DOCUMENTS

| | | | | |
|---|---|---|---|---|
| 2013/0321400 | A1* | 12/2013 | van Os | G06F 16/2291 345/419 |
| 2019/0339085 | A1* | 11/2019 | Naef | B60L 15/2045 |
| 2020/0104290 | A1 | 4/2020 | Sakaguchi et al. | |
| 2020/0118424 | A1 | 4/2020 | Hayashi et al. | |
| 2020/0133303 | A1 | 4/2020 | Sakaguchi | |
| 2022/0221300 | A1* | 7/2022 | Chikamori | G01C 21/3815 |
| 2023/0019719 | A1* | 1/2023 | Mo | G01C 21/3819 |

* cited by examiner

FIG. 6A
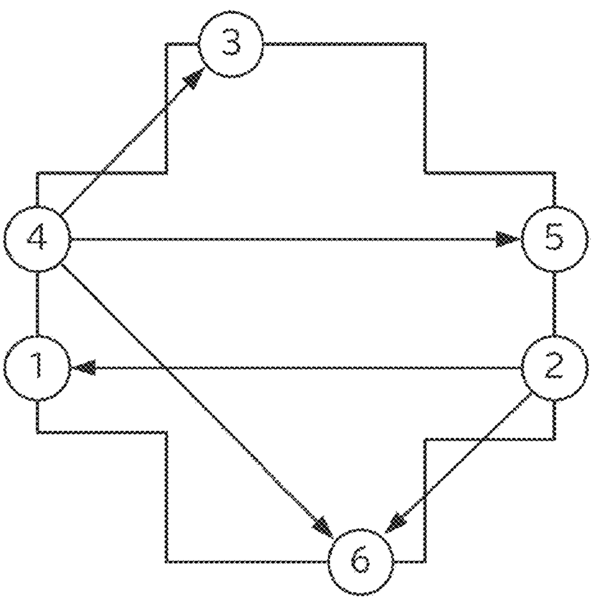
FIG. 6B
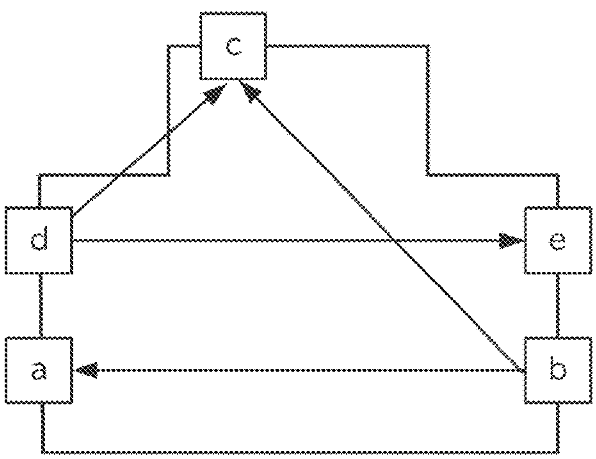
FIG. 6C
GRAPH EDITING PATH:
<NODE>
1→a, 2→b, 3→c, 4→d, 5→e, 6→ε,
<EDGE>
(2, 1)→(b, a), (2, 6)→ε, (4, 3)→(d, c),
(4, 5)→(d, e), (4, 6)→ε, ε→(b, c)

INFORMATION PROCESSING DEVICE

CROSS-REFERENCE TO RELATED APPLICATION

This application claims priority to Japanese Patent Application No. 2023-163106 filed on Sep. 26, 2023, incorporated herein by reference in its entirety.

BACKGROUND

1. Technical Field

The present disclosure relates to an information processing device, and more particularly to an information processing device that extracts a difference between two maps.

2. Description of Related Art

As a method of extracting a difference between two maps, there is disclosed a method in which maps are divided into meshes and a difference is extracted for each mesh. If there is an error between the maps, however, the same node or edge may be included in different meshes, and the meshes or edges may not be correlated or may be erroneously correlated, so that difference extraction may not be performed appropriately.

SUMMARY

An object of one aspect of the present disclosure is to provide a technique capable of extracting a difference between a reference map and an input map with higher accuracy than in the related art.

One aspect of the present disclosure provides an information processing device that detects a difference between a reference map and an input map, including a control unit configured to:

- acquire a reference map and an input map each including a plurality of nodes and a plurality of edges;
- divide each region of the reference map and the input map into a branch region in which a road or a lane is branched and a non-branch region other than the branch region;
- determine the branch region and the non-branch region of the input map corresponding to the branch region and the non-branch region of the reference map based on a degree of overlap between the branch region of the reference map and the branch region of the input map and a degree of overlap between the non-branch region of the reference map and the non-branch region of the input map;
- calculate, for each of the corresponding regions, a graph editing path that minimizes an editing cost determined by a predetermined criterion; and
- output graph editing paths for a plurality of the corresponding regions as the difference between the reference map and the input map.

According to the aspect of the present disclosure, it is possible to extract a difference between a reference map and an input map with higher accuracy than in the related art.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a diagram illustrating a result of extracting a difference according to an embodiment;

FIG. 6B is a diagram illustrating a result of extracting a difference according to an embodiment; and FIG. 6C is a diagram illustrating a result of extracting a difference according to an embodiment.

DETAILED DESCRIPTION OF EMBODIMENTS

Hereinafter, embodiments of the present disclosure will be described with reference to the drawings. The configuration of the following embodiment is an example, and the present disclosure is not limited to the configuration of the embodiment.

System Configuration

Figure 1A:
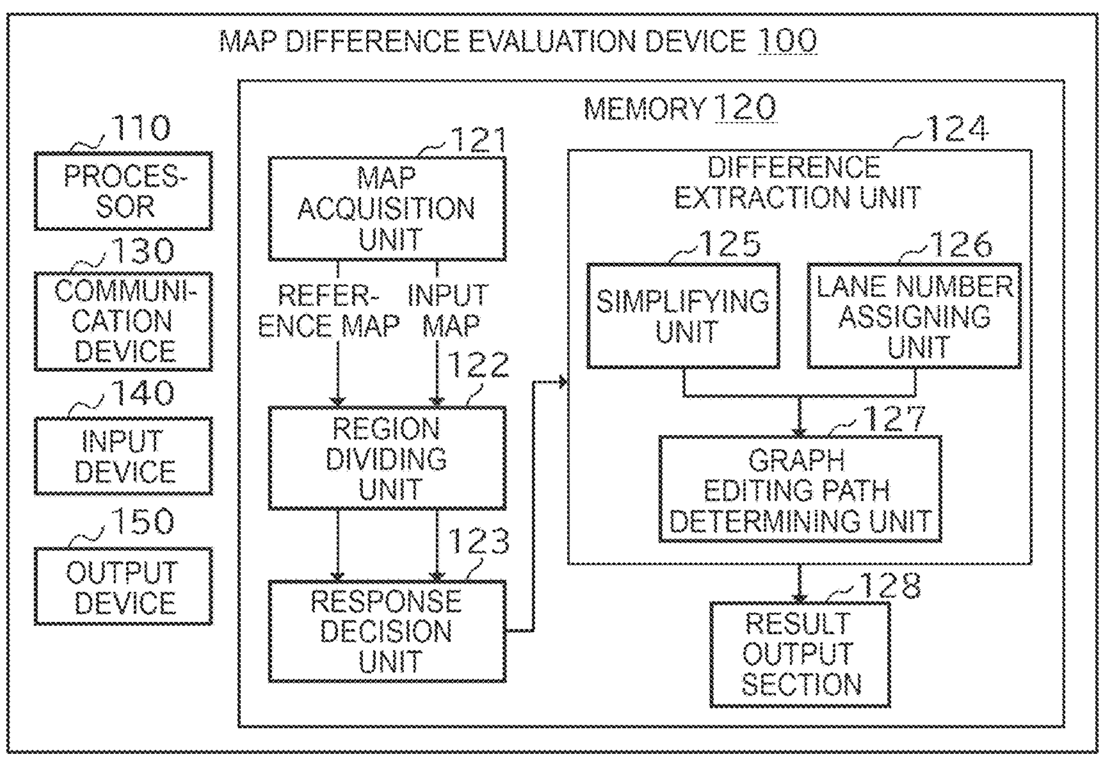
FIG. 1A is a diagram illustrating a functional block diagram of a map difference evaluating apparatus (information processing device) according to an embodiment.

FIG. 1A is a diagram illustrating a configuration of a map difference evaluation device 100 according to an embodiment. The map difference evaluation device 100 is an information processing device (computer) having a configuration in which the processor 110, the memory 120, the communication device 130, the input device 140, and the output device 150 are communicably connected to each other via a bus.

The processor 110 is an arithmetic device such as a Central Processing Unit (CPU), and operates in accordance with a program stored in the memory 120. The processor 110 corresponds to a control unit in the present disclosure. The memory 120 is a main storage device, and is used as a temporary storage device by the processor 110 as well as a load of an execution program. The communication device 130 is a device for performing communication with another information processing device by wired communication or wireless communication. The input device 140 is a keyboard or a mouse and receives input from a user. The output device 150 is a display device or an audio reproduction device, and outputs a calculation result or the like to the user.

The execution program loaded into the memory 120, when executed by the processor 110, causes the processor 110 to function as the map acquisition unit 121, the region dividing unit 122, the correspondence determination unit 123, the difference extraction unit 124, and the result output unit 128. The difference extraction unit 124 includes a simplifying unit 125, a lane number assigning unit 126, and a graph editing path determining unit 127 as sub-functional units. Details of each functional unit will be described below with reference to a flowchart.

Processing

Figure 1B:
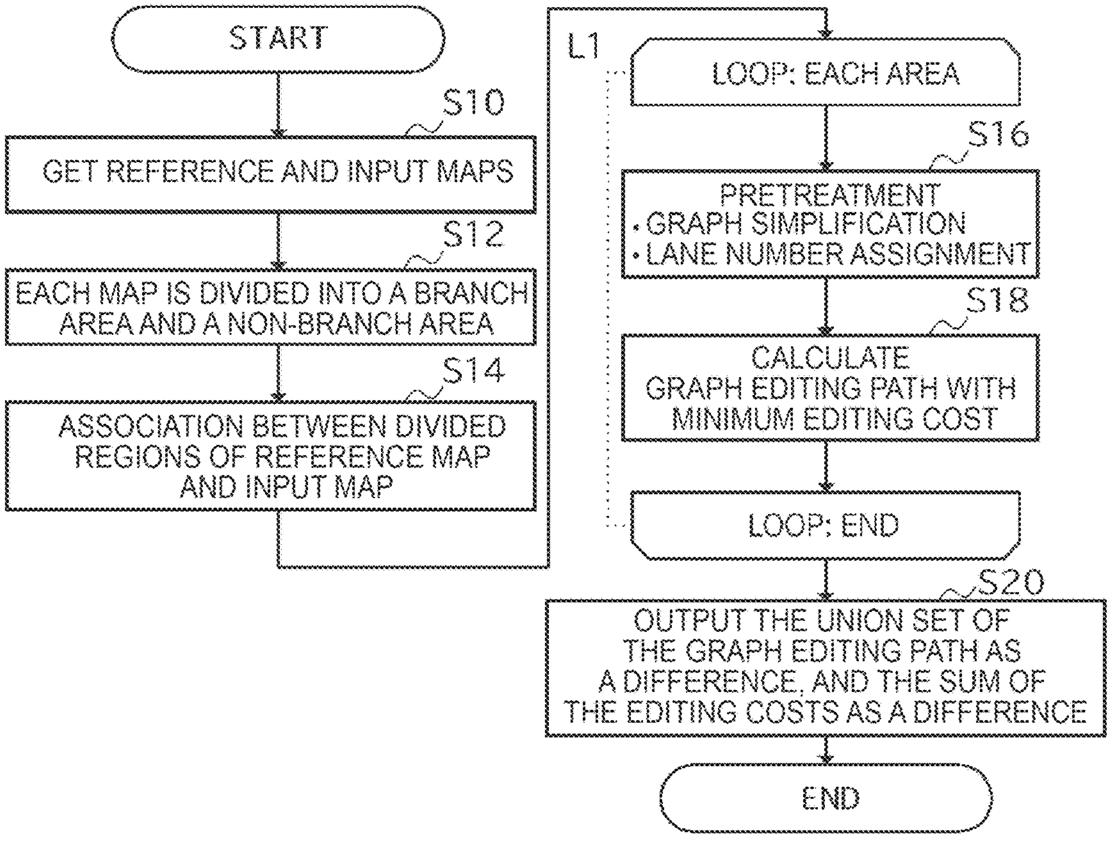
FIG. 1B is a diagram illustrating a flow chart of a map difference extracting process according to an embodiment.

FIG. 1B is a flow chart showing a flow of a map difference evaluation process executed by the map difference evaluation device 100.

In S10, the map acquisition unit 121 acquires a reference map and an inputted map. The reference map is a map serving as a reference for difference evaluation, and the map difference evaluation device 100 evaluates how or how different the input map is with respect to the reference map. As an example, the reference map is a map generated at a certain time, and the input map is a map generated at a subsequent time. In this case, the map difference evaluation device 100 is used, for example, to evaluate what kind of difference has occurred over time. As another example, the reference map is a high-precision map created by a high-cost but accurate method, and the input map is a map created by a low-cost automatic generation method. In this case, the map difference evaluation device 100 is used, for example, to evaluate the accuracy of an automatically generated map and thus the accuracy of an automatic generation algorithm.

The format of the reference map and the input map are the same, and both include a plurality of nodes and a plurality of edges (links). In the present embodiment, the map includes at least a node and an edge of each lane. The map may also include nodes and edges on a road-by-road basis. Further, the map may include information for identifying an area (road area) in which the road is present. The road region may be divided into an intersection region (branch region) and a non-intersection region (non-branch region), and the map may include information for identifying the intersection region and the non-intersection region.

Figure 2:
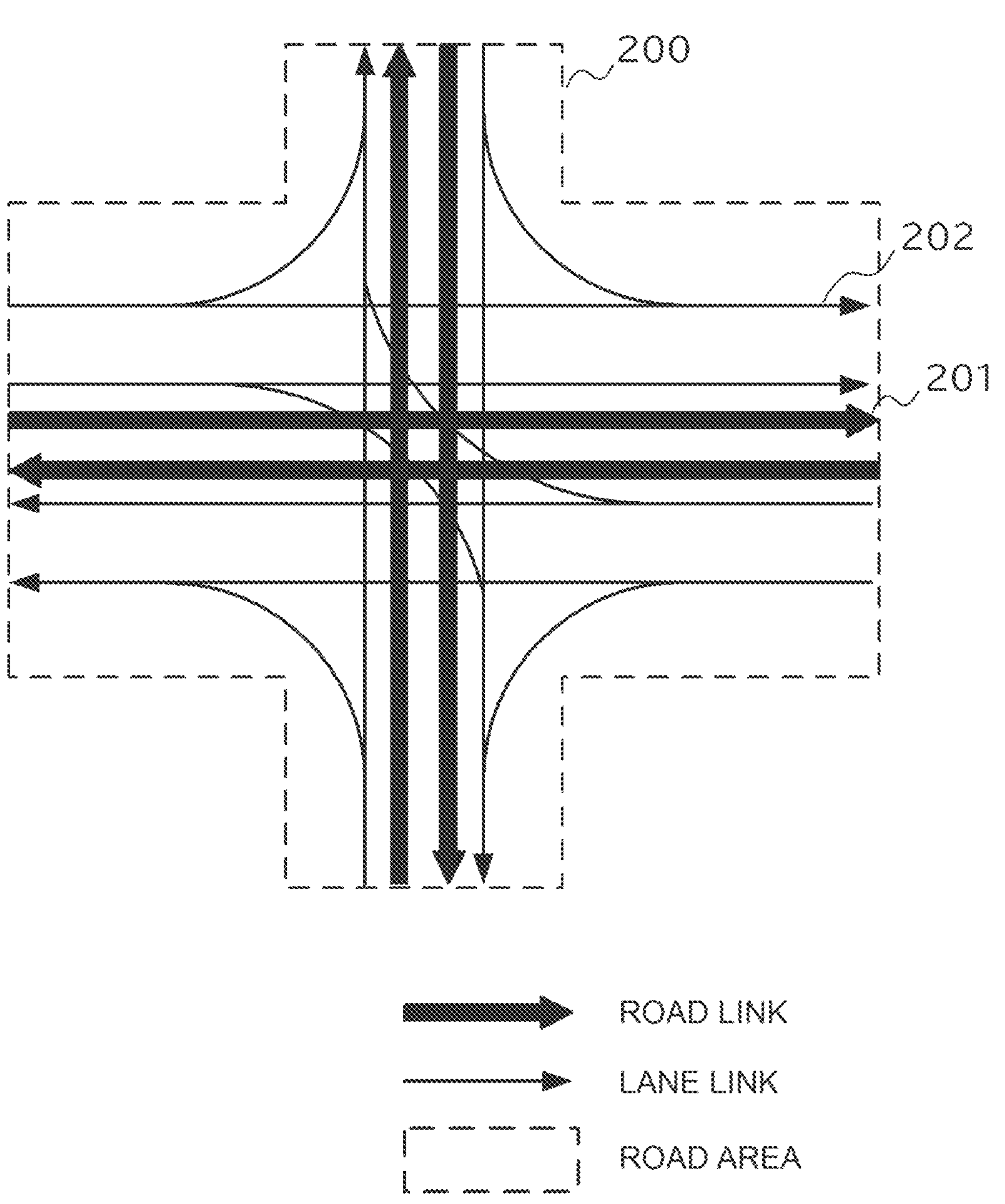
FIG. 2 is a diagram illustrating a format of map data in an embodiment.

FIG. 2 is a diagram for explaining an example of map data, and shows an example of a map representing an intersection portion where a road of one-side two lanes and a road of one-side one lane intersect. In this example, the map data includes a road area 200, a road link 201, and a lane link 202. More specifically, the lane link 202 includes an edge (link) that connects a plurality of lane nodes to a node. The spacing between the nodes is, for example, on the order of a few meters. The connection relationship between the lanes can be grasped from the lane link. For example, in the example of FIG. 2, a left turn is possible in all directions, while a right turn is possible from a road with two lanes on one side to a road with one lane on one side, and vice versa.

Figure 3A:
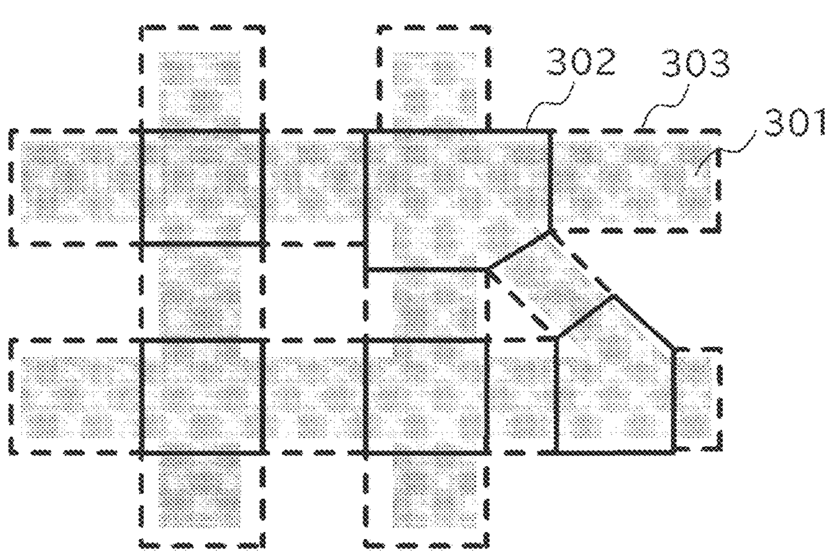
FIG. 3A is a diagram for describing segmentation of a map in an embodiment.

In S12, the region dividing unit 122 divides each region of the reference map and the inputted map into a branch region in which a road or a lane branch is present and a non-branch region other than the branch region. FIG. 3A shows the result of the region dividing process, and shows that the road region 301 of the reference map or the inputted map is divided into a branch region 302 indicated by a solid line and a non-branch region 303 indicated by a broken line. Hereinafter, each region is also referred to as a divided region.

The division processing by the region dividing unit 122 is performed according to this information, for example, when information (for example, a label) for specifying the intersection region (branch region) and the non-intersection region (non-branch region) is added to the map data. Alternatively, the division processing by the region dividing unit 122 may be performed based on the position of a node (branch node) to which three or more edges are connected from the map data. Specifically, the region dividing unit 122 may extract a branch node, determine a region in which a branch node exists by clustering processing, and determine the obtained region as a branch region and the other road region as a non-branch region. The region division method may be performed by a method other than the method described here.

In S14, the correspondence determination unit 123 determines a branch area of the input map corresponding to the branch area of the reference map and a non-branch area of the input map corresponding to the non-branch area of the reference map. The correspondence determination unit 123 performs the association based on the degree of overlap between the divided region of the reference map and the branch region of the input map, and the degree of overlap between the unbranched region of the reference map and the unbranched region of the input map. Here, it is conceivable to evaluate the degree of overlap based on a relative criterion, for example, the ratio of the overlap area to the size (area) of the branch area of the reference map or the input map. Alternatively, it is also conceivable to evaluate the degree of overlap based on an absolute criterion, for example the size (area) of the overlap region. Further, the degree of overlap may be evaluated by a combination of the ratio of the overlap regions and the size of the overlap regions.

Figure 3B:
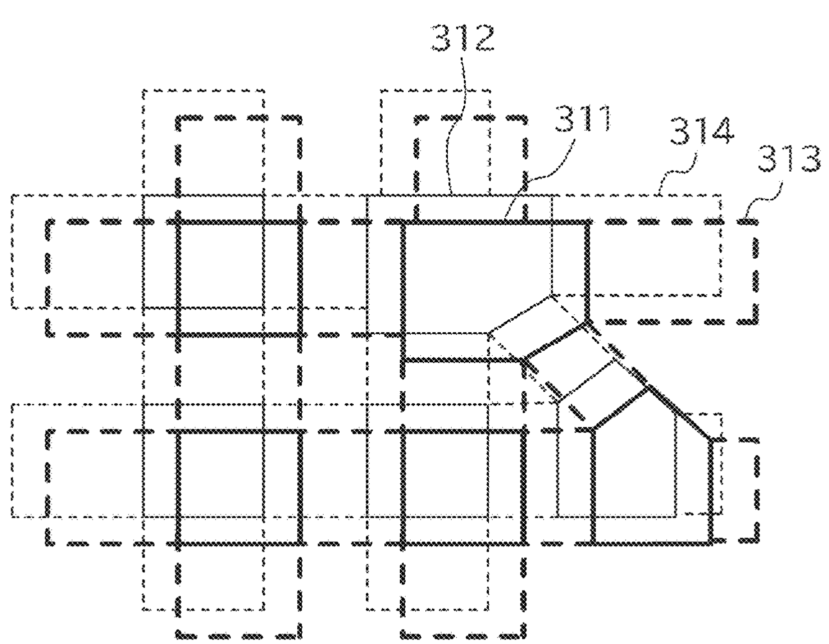
FIG. 3B is a diagram for explaining association of divided regions according to an embodiment.
Figure 3B:
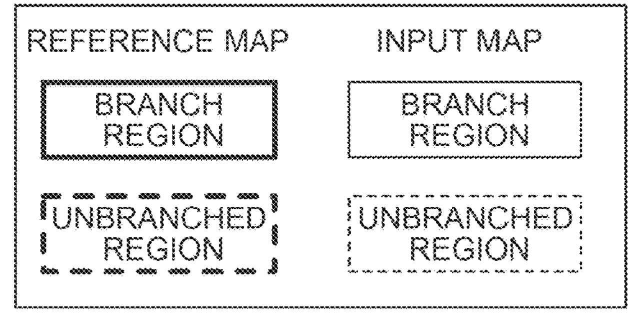

FIG. 3B is a diagram showing a reference map and an area division result for the inputted map. The thick solid line represents a branch area of the reference map, the thick broken line represents a non-branch area of the reference map, the thin solid line represents a branch area of the input map, and the thin broken line represents a non-branch area of the input map. In the correspondence determination process described above, for example, the branch region 311 of the reference map and the branch region 312 of the input map are associated with each other, and the non-branch region 313 of the reference map and the non-branch region 314 of the input map are associated with each other.

In FIG. 3B, the reference map and the divided regions of the inputted map have the same shapes, and are described so as to be substantially one-to-one associated with each other. In addition, there may be a case where one divided region in the reference map is divided so as to correspond to a plurality of divided regions in the input map, or vice versa. In such a case, the correspondence determination unit 123 may determine the correspondence relationship after integrating a plurality of divided regions into one.

S16 to S18 looping L1 is executed for each of the divided area pairs associated with S14.

S16 is a preprocessing of the difference extracting processing, and includes a graph-simplifying processing performed by the simplifying unit 125 and a lane number assigning processing performed by the lane number assigning unit 126.

Figure 4A:
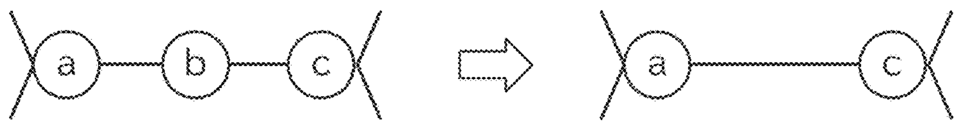
FIG. 4A is a diagram illustrating the deletion of a non-branching intermediate-node in an embodiment.

The simplifying unit 125 simplifies the graph by deleting a node in the region that is unnecessary for processing. Specifically, as shown in FIG. 4A, the simplifying unit 125 deletes the non-branching intermediate node and edits the nodes at both ends of the non-branching intermediate node so as to be connected by an edge (linkage). Note that the non-branch intermediate node is a node other than the entry end and the exit end of the divided region (branch region or non-branch region), and is not a branch node. The entry end node is a node connected from a node in an adjacent divided region, and the exit end node is a node connected to a node in an adjacent divided region. In FIG. 4A, the node b between the branch nodes a,c corresponds to the non-branch intermediate node, the node b is deleted by the simplification process, and the node a and the node c are edited so as to be connected. This replaces edges (a,b) and (b,c) with edges (a,c).

Figure 4B:
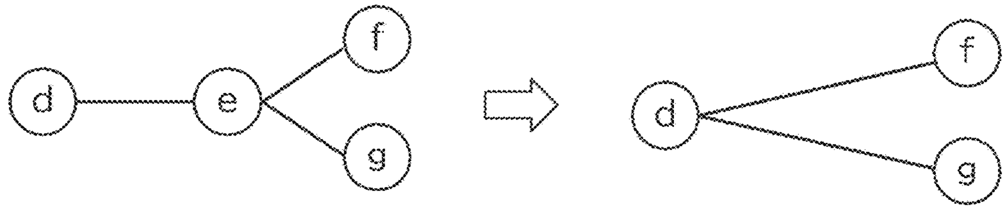
FIG. 4B is a diagram illustrating deletion of a branch node connected to an entry end node or an exit end node according to an embodiment.

Further, the simplifying unit 125 may integrate the branch node connected to the entry end node or the exit end node with the entry end node or the exit end node. This process can also be regarded as a process of deleting a branch node and editing an edge connected to the branch node so as to be connected to an entry end node or an exit end node. In FIG. 4B, since the node e as the branch node is connected to the node d at the entry end or the exit end, the node e is deleted, and the edges (e,f) and (e,g) connected to the node e are replaced with the edges (d,f) and (d,g).

Figure 4C:
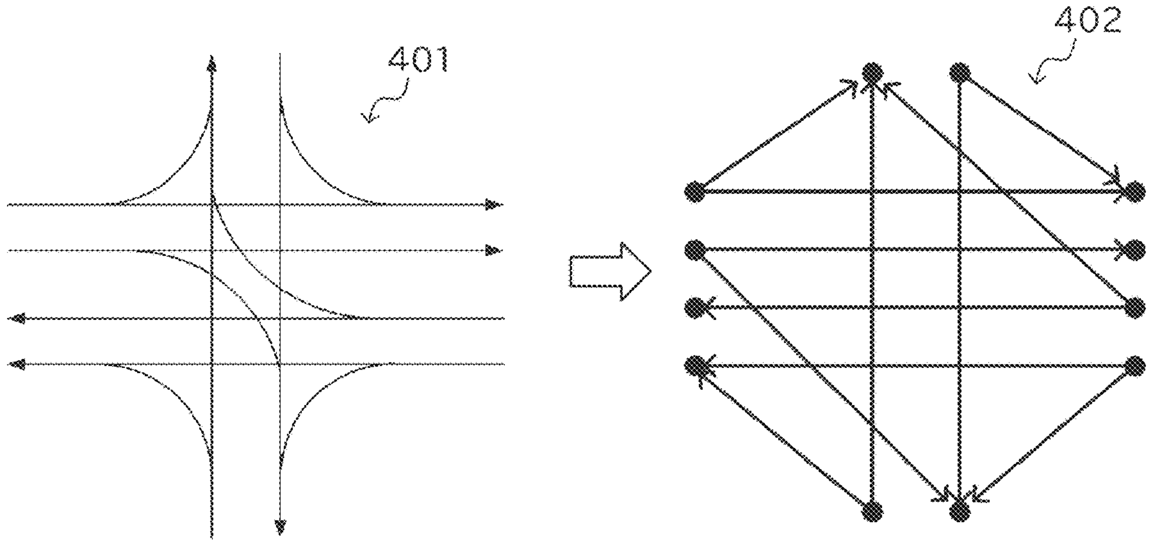
FIG. 4C is a diagram illustrating a simplified graph according to an embodiment.

Through these processes, all the nodes in the divided region are deleted, and only the ingress end node and the egress end node remain. FIG. 4C shows an example of graph simplification. Graph 401 shows a graph before simplification, and graph 402 shows a graph after simplification. Although the node is not shown with respect to the graph 401, there are actually dense nodes (every few meters). On the other hand, a node is shown for graph 402. The graph 402 has only an ingress end node and an egress end node, and there are only edges connecting the ingress end node and the egress end node.

By simplifying the graph in this way, it is possible to reduce the problem size of optimization of the graph editing path, and at the same time, to improve the accuracy of the difference extraction by leaving only semantically important nodes.

Figure 4D:
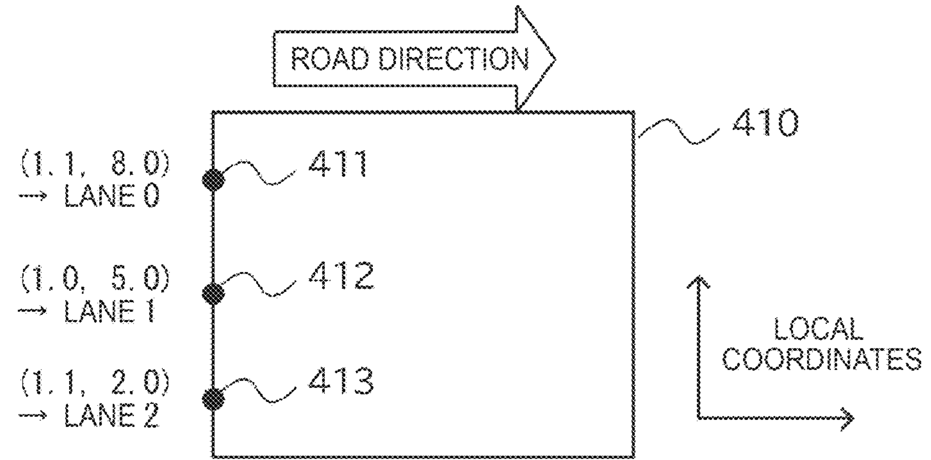
FIG. 4D is a diagram illustrating application of a lane number according to an embodiment.

The lane number assigning unit 126 assigns lane numbers to lanes included in the respective roads in a predetermined order. The lane numbering process may be executed on the graph after the simplification, or may be executed on the graph before the simplification. Referring to FIG. 4D, the lane number assignment process will be described with reference to a situation in which three lane nodes 411 to 413 at the entry ends are present on the roadway 410. The lane number assigning unit 126 obtains coordinates of the respective nodes 411 to 413 by a local coordinate system in which the lane direction is an X-axis and the width direction of the lane is a Y-axis, and assigns the lane numbers in descending order of the Y-axis positions. For example, the coordinates of node 411 are (1.1, 8.0), the coordinates of node 412 are (1.0, 5.0), and the coordinates of node 413 are (1.1, 2.0). Accordingly, lane number 0 is assigned to node 411, lane number 1 is assigned to node 412, and lane number 2 is assigned to node 413. It should be noted that it is not essential to assign lane numbers in descending order of the Y-axis position, and lane numbers may be assigned in ascending order of the Y-axis position, or lane numbers may be assigned in an order determined by an arbitrary deterministic procedure. The lane number assigning unit 126 may assign a lane number to both the entry end and the exit end, or may assign a lane number to only one of the entry end and the exit end.

In S18, the graph editing path determining unit 127 obtains a graph editing path in which the editing cost is minimized with respect to the reference map and the inputted map after the simplification process and the lane number assignment process are performed. The graph editing path is a column of an editing operation for matching the first graph to the second graph, and the editing operation includes addition, deletion, and substitution of a node, and addition, deletion, and substitution of an edge (link). Any conventional algorithms (e.g., ZeinaAbu-Aisheh, Romain Raveaux, Jean-Yves Ramel, Patrick Martineau. An Exact Graph Edit Distance Algorithm for Solving Pattern Recognition Problems. 4$^{th}$ International Conference on Pattern Recognition Applications and Methods 2015 January 2015, Lisbon, Portugal. 2015, <10.5220/0005209202710278>.<hal-01168816>) can be employed to rescue graph-editing paths with minimal editing costs.

Editing costs for individual graph editing operations may be determined on a predetermined basis.

Figure 5A:
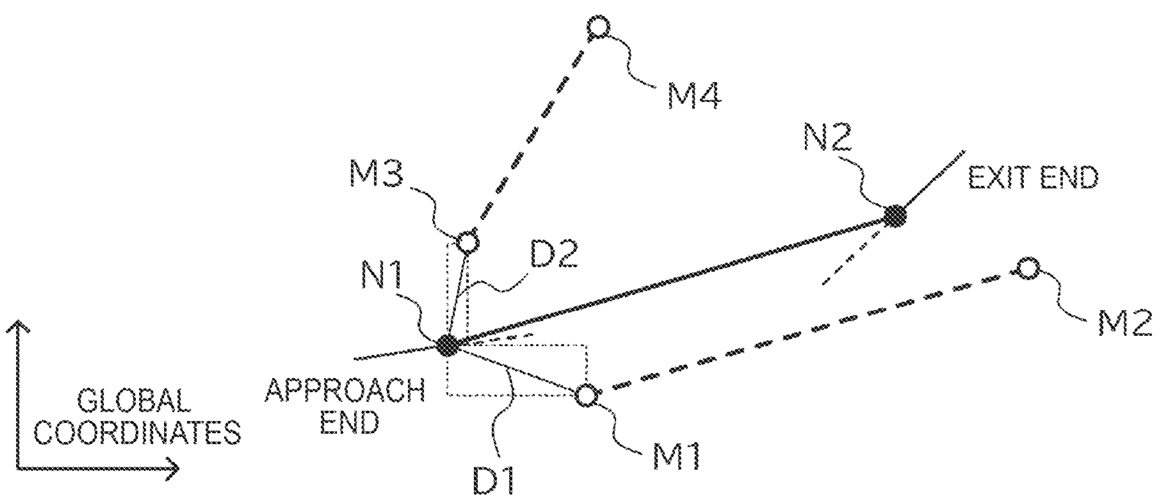
FIG. 5A is a diagram illustrating an example of a graph-editing cost according to an embodiment.
Figure 5B:
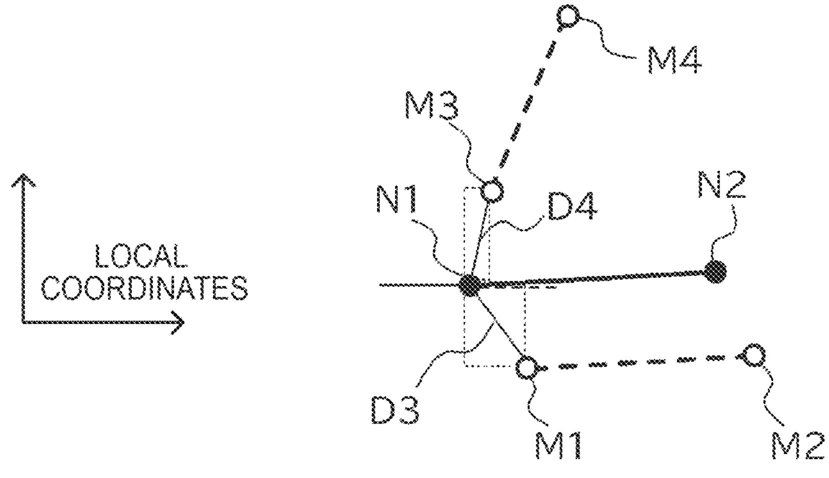
FIG. 5B is a diagram illustrating an example of a graph-editing cost according to an embodiment.

In the present embodiment, the cost of substituting (replacing) the node is basically set to be smaller as the positions of the two nodes are closer to each other, and to be larger as the positions of the two nodes are farther from each other. However, when the distance between the two nodes is determined, the influence of the distance in the lane width direction is larger than the distance in the lane direction, and the weight is evaluated. FIGS. 5A and 5B are diagrams for explaining the cost of a location-based node-alternative. FIG. 5A indicates the node N1,N2 of the reference map and the node M1 to M4 of the inputted map. FIG. 5A is shown in a global coordinate system, where the up-down direction corresponds to the latitude direction and the left-right direction corresponds to the longitude direction, and the distance (length) on the drawing corresponds to the actual distance (length). In this case, it can be said that the node N1 of the reference map is appropriately associated with the node M1 of the inputted map. However, if the distance D1 between the node N1-M1 is larger than the distance D2 between the node N1-M3, the node N1 is associated with the node M3 when simply evaluating the distance between the nodes. Therefore, in the present embodiment, the cost is evaluated so that the influence of the distance in the lane width direction becomes large as follows. First, a local coordinate system in which the lane direction in the node N1 is the X-axis and the direction perpendicular to the lane direction is the Y-axis is introduced. Here, the lane direction in the node N1 may be, for example, a direction of an edge connected from a divided region adjoining the node N1 or a direction of an edge in the same divided region connected to the node N1. The scale in the X-axis direction is compressed, and the scale in the Y-axis direction is maintained. The compression ratio is, for example, 0. It can be 5, but may be a value greater than 0 and less than 1. FIG. 5B shows a plot after coordinate transformation and X-axis compressions. The distance between the nodes after the conversion is evaluated as a node substitute cost. In the example of FIG. 5B, since the distance D3 is smaller than the distance D4, the node of the inputted map associated with the node N1 of the reference map is appropriately determined as the node M1. In the evaluation of the map, the positional deviation in the width direction of the road has a larger impact than the positional deviation in the traveling direction of the road. That is, a difference associated with a node having a small positional deviation in the width direction can be set as a better difference. Note that the above description is intended to explain the concept of the node substitution cost, and the processing actually performed may be performed in accordance with the above-described concept, and may not be performed as described above.

Further, in the present embodiment, the cost of the node substitution (replacement) may be determined depending on whether the lane numbers assigned to the nodes are the same or different. For example, the editing cost of replacing a node with a node having a different lane number is higher than the editing cost of replacing the node with a node having the same lane number. In other words, the editing cost when the nodes having different lane numbers are associated with each other is larger than the editing cost when the nodes having the same lane number are associated with each other. By using such a cost criterion, it is possible to make a difference in which semantically the same lanes are associated with each other a better difference.

The cost of the node alternative may be the sum of the cost based on the location described above and the cost based on the identity of the lane number.

The cost of adding and deleting nodes may be set as appropriate.

The cost of adding, deleting, or replacing an edge may be set in the same manner as the cost of adding, deleting, or replacing a node. For example, the cost of edge substitution may be the sum of the cost of node substitution at both ends of the edge.

FIGS. 6A to 6C are each a diagram for explaining the calculation of the graph-editing path. FIG. 6A shows a simplified graph of a reference map, FIG. 6B shows a simplified graph of an incoming map, and FIG. 6C shows a graph editing path with minimal editing costs for these two maps (graphs). In the editing operation of the node, the substitution of the node 1 to the node a is expressed as "1→a", the deletion of the node 1 is expressed as "1→ε8", and the addition of the node a is expressed as "ε→a". Similarly, the substitution from edge (1, 2) to edge (a,b) is expressed as "(1,2)→(a,b)", the deletion of edge (1, 2) is expressed as "(1, 2)→ε", and the addition of edge (a,b) is expressed as "ε→→(a,b)". In the examples of FIGS. 6A to 6C, the node 6 is deleted, the nodes 1 to 5 are replaced with the nodes a to e, respectively, the edges (4, 6) and (2, 6) are deleted, and the edge (b,c) is added.

As described above, the difference extraction unit 124 obtains a graph editing path having the smallest editing cost for one pair of divided regions corresponding to each other. Then, in the loop-processing L1, a graph-editing-path is similarly obtained for each of the corresponding pair of divided regions.

In S20, the result output unit 128 outputs the result of the difference estimation to the output device 150. An example of the evaluation result is a difference or a degree of difference (or a distance) between the reference map and the input map. The difference between the reference map and the input map is obtained as a union of the graph editing paths for each pair of divided regions. The difference between the reference map and the input map is obtained as the sum of the graph editing costs for each pair of divided regions. The result output unit 128 may output only one of the difference and the dissimilarity that may be output.

Advantageous Effect of the Present Embodiment

According to the present embodiment, by dividing a complicated task of evaluating the difference between two maps into a simple task of evaluating the difference for each divided region, it is possible to perform high-speed and highly accurate difference evaluation. Here, when a region is divided, if static division is performed, a certain node may be included in a different region due to a position error, but in the present embodiment, dynamic division is performed in consideration of the branch region and the non-branch region, so that such a problem can be avoided. In other words, in the present embodiment, by performing dynamic region division in consideration of the macro topology of the road, it is possible to perform division and region association such that the corresponding reference map and the node of the input map are included in the corresponding region.

In addition, in the differential extraction of a map (graph), by simplifying the graph, elements having little influence on accuracy are deleted, and efficient differential extraction is enabled. By simplifying the problem, it is possible to adopt a difference extraction algorithm with high computational load but higher accuracy, and it is possible to improve the accuracy of the difference extraction. Further, in the evaluation of the editing cost, by making the cost of the positional deviation larger than the deviation in the traveling direction in the lane width direction, appropriate difference evaluation considering the actual shape of the road can be executed. Furthermore, by setting the cost of substituting the same lane number to be low in consideration of the lane number, an appropriate difference evaluation considering the actual shape of the road can be performed.

As described above, according to the present embodiment, it is possible to perform high-speed and highly accurate difference evaluation by holding contexts such as lane numbers and lane directions and performing difference evaluation using the context while reducing the amount of information and reducing the problem size.

OTHER EMBODIMENTS

The above-described embodiments are merely examples, and the present disclosure can be appropriately modified without departing from the gist thereof.

The present disclosure can also be realized by supplying a computer program implementing the functions described in the above embodiments to a computer, and reading and executing the program by one or more processors included in the computer. Such a computer program may be provided to a computer by a non-transitory computer readable storage medium connectable to a system bus of the computer, or may be provided to the computer via a network. Non-transitory computer-readable storage media include, for example, any type of disk, such as a magnetic disk (floppy disk, hard disk drive (HDD), etc.), optical disk (CD-ROM, DVD disk, Blu-ray disk, etc.). Non-transitory computer-readable storage media include, for example, read only memory (ROM), random access memory (RAM), EPROM, EEPROM, magnetic cards, flash memory, optical cards, any type of media suitable for storing electronic instructions.

What is claimed is:

1. An information processing device comprising a processor and a memory storing instructions that are executable by the processor and that cause the processor to:

acquire a reference map and an input map each including a plurality of nodes and a plurality of edges;

divide each region of the reference map and the input map into a branch region in which a road or a lane is branched and a non-branch region other than the branch region;

determine the branch region and the non-branch region of the input map corresponding to the branch region and the non-branch region of the reference map based on a degree of overlap between the branch region of the reference map and the branch region of the input map and a degree of overlap between the non-branch region of the reference map and the non-branch region of the input map;

delete a non-branch intermediate node that is not a branch node and edit nodes at both ends of the non-branch intermediate node so as to be connected using an edge, the non-branch intermediate node being a node other than an entry end and an exit end of the branch region or the non-branch region;

after deleting the non-branch intermediate node and editing the nodes, calculate, for each of the corresponding regions, a graph editing path that minimizes an editing cost, the graph editing path being a sequence of editing operations including adding, deleting, and replacing nodes and edges; and output graph editing paths for a plurality of the corresponding regions as a difference between the reference map and the input map, wherein the editing cost is determined based on a coordinate system that compresses a scale in a traveling direction for distances between the nodes while maintaining a scale in a width direction orthogonal to the traveling direction, and the editing cost is larger as nodes to be correlated are positioned farther, and a larger editing cost is given to positional deviation in a direction orthogonal to a traveling direction of a road corresponding to a node than to positional deviation in the traveling direction.

2. The information processing device according to claim 1, wherein the processor is configured to output a sum of editing costs for the corresponding regions as a distance or a degree of difference between the reference map and the input map.

3. The information processing device according to claim 1, wherein the processor is configured to divide each of the regions of the reference map and the input map into the branch region and the non-branch region based on a position of a branch node included in the reference map and the input map or based on information specifying the branch region and provided to the reference map and the input map.

4. The information processing device according to claim 1, wherein:

the processor is configured to provide a lane number to lanes included in each road in a predetermined order; and the editing cost is larger when correlating nodes with different lane numbers than when correlating nodes with the same lane number.

5. The information processing device according to claim 1, wherein the processor is configured to:

in a case where the processor deletes the non-branch intermediate node and edits nodes at both ends of the non-branch intermediate node so as to be connected using an edge, merge a branch node connected to an entry end node or an exit end node of the branch region or the non-branch region with the entry end node or the exit end node;

assign lane numbers in a predetermined order to lanes included in each road; and in a case where the processor calculates the graph editing path, set the editing cost for nodes having a different lane number associated with each other to be greater than the editing cost for nodes having the same lane number associated with each other.

* * * * *